United States Patent [19]

Fritz et al.

[11] Patent Number: 5,037,129
[45] Date of Patent: Aug. 6, 1991

[54] SAFETY DEVICE FOR VEHICLE OCCUPANTS

[75] Inventors: Eberhard Fritz, Schwieberdingen; Bernhard Mattes, Sachsenheim; Werner Nitschke, Ditzingen; Lothar Gademann, Rottenburg, all of Fed. Rep. of Germany

[73] Assignee: Robert Bosch GmbH, Stuttgart, Fed. Rep. of Germany

[21] Appl. No.: 450,575

[22] Filed: Dec. 14, 1989

[30] Foreign Application Priority Data

Apr. 6, 1989 [DE] Fed. Rep. of Germany ....... 3911132
Jun. 20, 1989 [DE] Fed. Rep. of Germany ....... 3920091

[51] Int. Cl.$^5$ ............... B60R 21/00; B60R 22/40
[52] U.S. Cl. ................... 280/734; 280/735; 280/801; 340/436; 307/10.1

[58] Field of Search ........... 280/731, 734, 735, 801; 307/9, 10.1; 340/429, 436, 438, 431

[56] References Cited

U.S. PATENT DOCUMENTS

| 4,209,185 | 6/1980 | St. Clair et al. | 280/734 |
| 4,477,732 | 10/1984 | Mausner | 280/734 |
| 4,836,024 | 6/1989 | Woehrl | 340/436 |
| 4,873,452 | 10/1989 | Morota et al. | 280/734 |

Primary Examiner—Richard A. Bertsch
Attorney, Agent, or Firm—Kenyon & Kenyon

[57] ABSTRACT

In a safety device for vehicle occupants with acceleration-sensitive sensors and with processing circuits for the sensors summing and integrating devices as well as a comparator device for comparing the summation and integration values are provided. The comparator device controls a warning device as soon as the comparison value exceeds a presettable limit value.

9 Claims, 4 Drawing Sheets

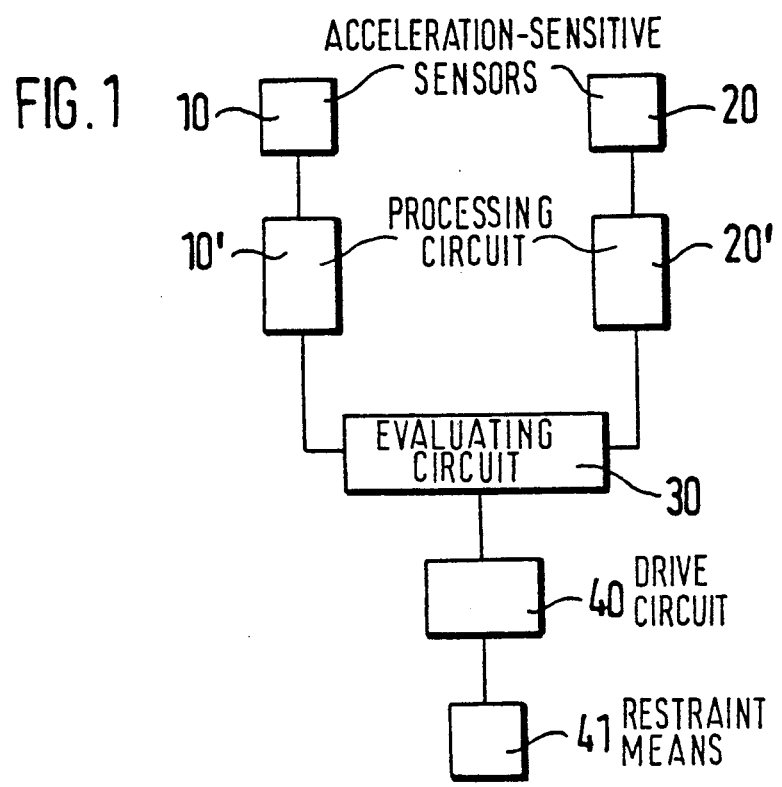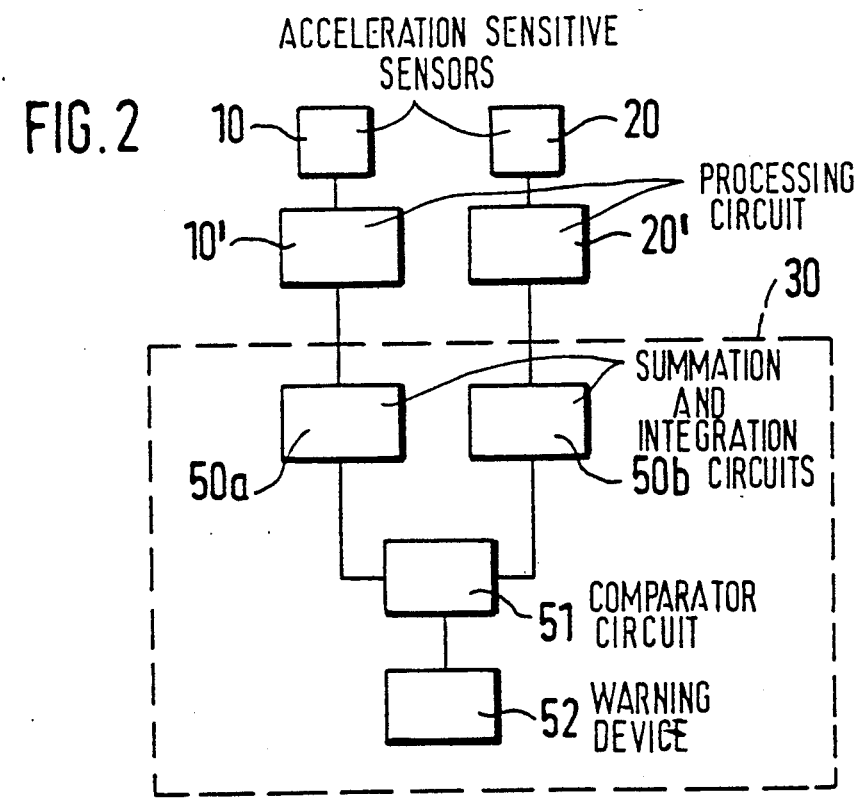

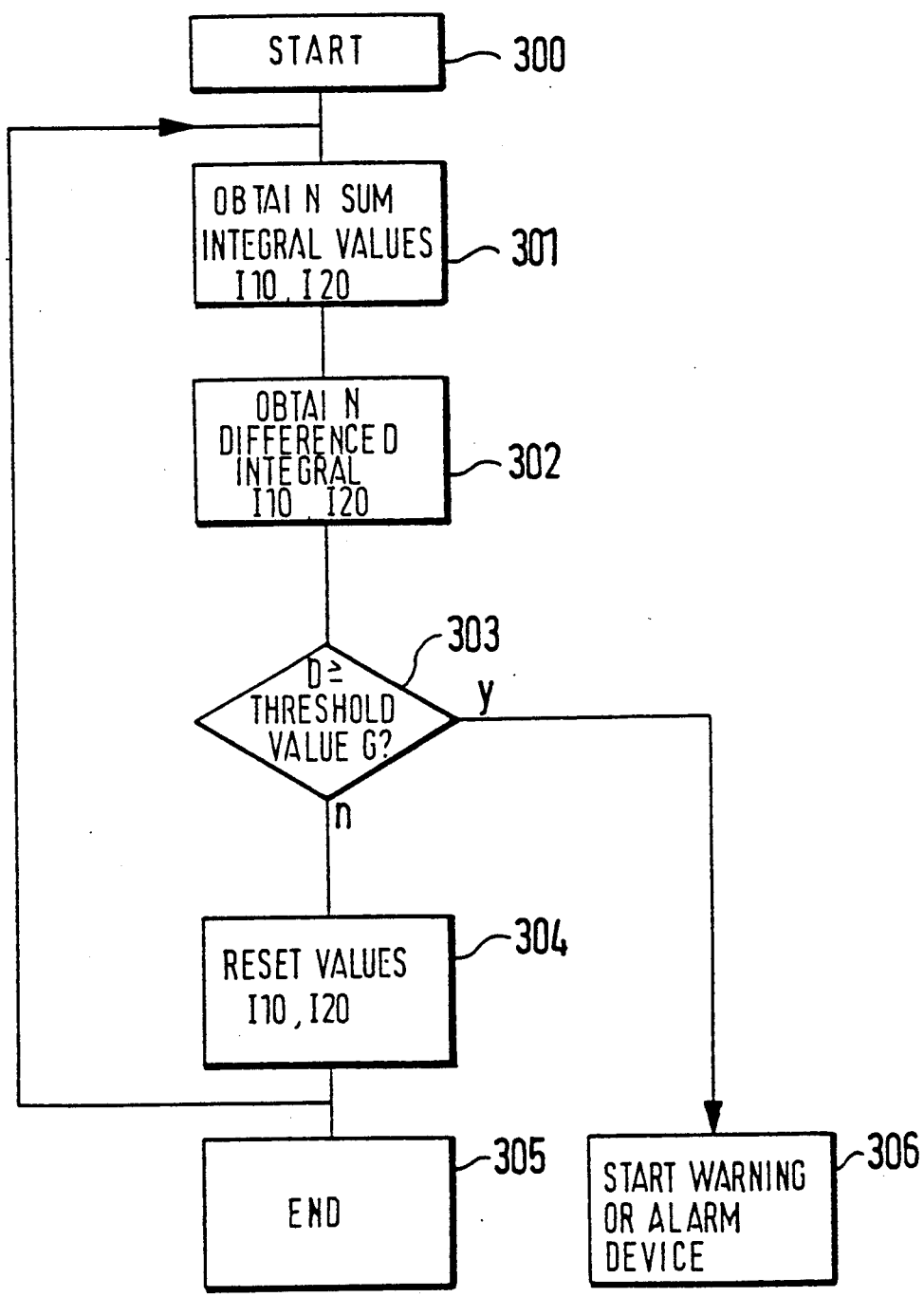

SAFETY DEVICE FOR VEHICLE OCCUPANTS

BACKGROUND OF THE INVENTION

The present invention relates to a safety device for vehicle occupants.

From GB-PS 1,368,899 a safety device is known having a collision switch and a delay sensor as well as having a coincidence comparator connected to the collision switch and the delay sensor. The coincidence comparator receives electrical signals from the collision switch and from the delay sensor and interrupts the operation of the device if these signals do not arrive within a presettable length of time. In this way false release of the safety device is prevented.

From U.S. Pat. No 3,701,903 a piezoelectric vehicle collision sensor is further known in which two piezocrystals with sensitivity axes arranged differently in space are disposed inside a vehicle, the two piezocrystals being connected electrically in parallel in a single evaluation circuit.

In this known safety device or this known sensor it is not possible to check the acceleration-sensitive sensors for functionality continuously, i.e., in particular, also during operation of the vehicle. The disadvantage of this is, however, that high reliability of such safety devices, also with respect to failure of a sensor, cannot be ensured.

SUMMARY OF THE INVENTION

It is an object of the present invention to provide a safety device for vehicle occupants that can be checked continuously, in particular also during the actual running of the vehicle, and also with respect to the functionality of the sensors and their processing circuits. Thereby a considerable further improvement with respect to a high reliability of such a safety-relevant device is obtained.

The above and other objects of the invention are achieved by a safety device for vehicle occupants comprising restraint means and a drive circuit for the restraint means, and further comprising at least two acceleration-sensitive sensors and for each sensor a processing circuit and means for comparing the sensor output signals with one another to activate a further device, preferably a warning device.

Further it is possible in an especially simple and advantageous manner to detect and to eliminate disturbance effects on the safety device and in particular the sensors or their processing and evaluating circuit, which in a conventional safety device would lead to failure or an unintended false release. Such disturbance parameters may be in particular strong temperature fluctuations and/or parasitic influences from vehicle-specific or external electromagnetic interference fields.

BRIEF DESCRIPTION OF THE DRAWINGS

The invention will be described in greater detail in the following detailed description with reference to the drawings, in which:

FIG. 1 shows a block diagram of the safety device;

FIG. 2 shows a second block diagram of the safety device;

FIG. 3 shows a sequence diagram to explain the operation of the safety device;

DETAILED DESCRIPTION

Figure 4:
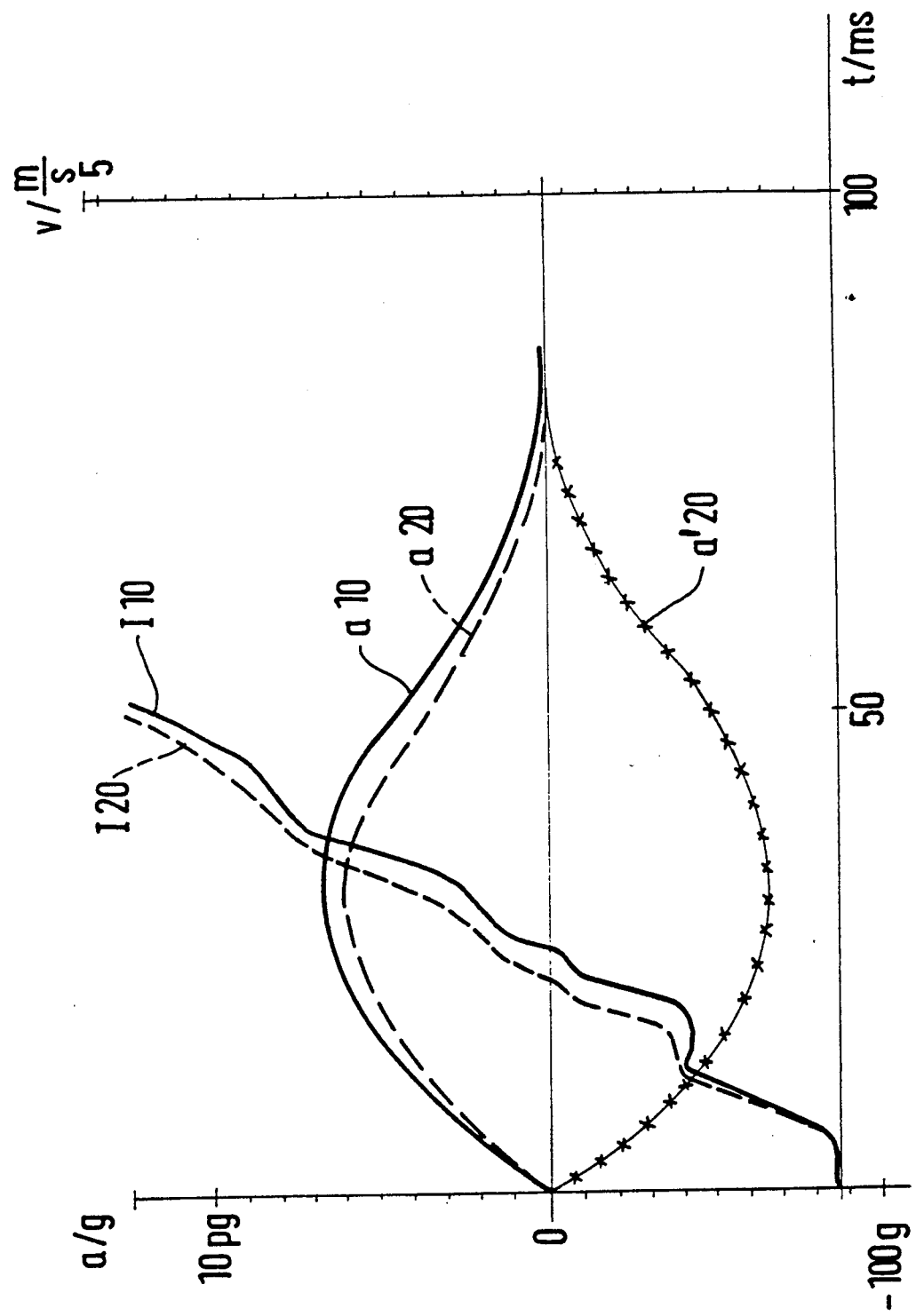
FIG. 4 shows a graph showing curves of acceleration and time integral of the acceleration as a function of time.

A safety device for vehicle occupants comprises according to the block diagram of FIG. 1, at least two acceleration-sensitive sensors 10, 20, a processing circuit 10', 20' assigned to each r,f these sensors 10, 20, as well as an evaluating circuit 30 for the evaluation of the output signals of the sensors 10, 20, a drive circuit 40 for the actuation of restraint means, and restraint means 41, as for example air bags and/or strap tighteners. The acceleration-sensitive sensors 10, 20 may be piezoelectric sensors which, in corresponding installed position in the vehicle, experience a force upon acceleration stresses and consequently deliver an output signal proportional to the acceleration. In processing circuits 10', 20' the output signals of the sensors 10, 20 are processed, in particular also amplified, and then sent to the input terminals of an evaluation circuit 30, which subjects the output signal of the sensors 10, 20 to suitable evaluation criteria, to establish whether an acceleration attributable to an accident event is at hand which necessitates the release of the restraint means. To this end, for example, in the evaluation circuit 30, the acceleration-proportional output of the sensors 10, 20 is first integrated and then compared with a presettable threshold. If the integral value exceeds the presettable threshold value, an accident event is assumed and the restraint means 41 is released by means of the drive circuit 40 activated by the output of the evaluation circuit 30. Now according to the invention at least two sensors 10, 20 as well as a processing circuit 10', 20' assigned to each sensor 10, 20 are provided.

In a first embodiment of the invention, two sensors 10, 20 show an output signal behavior identical in the ideal case, i.e. they deliver when acted upon with the same acceleration stress substantially identical output signals, represented in FIG. 4 by the curves a 10, a20, as a representation of the acceleration as a function of time. Acceleration signals, which can be made use of for a comparison and hence for monitoring the operation of the sensors 10, 20 and of the associated evaluation circuits 10, 20 will occur practically on any trip. Thus continuous function control of the sensors and evaluation circuits is possible.

According to the block diagram of FIG. 2, the evaluation circuit 30 comprises summation and integration circuits 50a, 50b associated with each sensor channel. The output terminals of the summation and integration circuits 50a, 50b are connected to input terminals of a comparator circuit 51, the output terminal of which is in turn connected to the input of a warning device 52. The summation and integration circuits 50a, 50b form the sums and integrals I10, I20 of the output signal curves a10, a20 per FIG. 4. Compare concerning this and the following also the sequence diagram of FIG. 3, to which reference also is made. After a presettable interval of time the sum and integral values (curves I10, I20) (obtained at step 301) are compared with one another in the comparator circuit 51. See step 302. If the comparison value lies below a presettable desired value (threshold G, step 303), the sums and integral values of the sum/integration circuit 50a, 50b are set back (step 304) and a new sum/integration formation for a further time interval begins. If, however, the comparison in comparator circuit 51 shows a deviation of the sum or integral values from the presettable desired value G, the comparator circuit 51 triggers a warning device 52, which will, for example, alert the driver of the vehicle of a fault of the safety device (step 306). He is thereby made aware that from this moment on he must no longer rely on the safety device and possibly must immediately go to a repair shop. In addition a switching means not shown in the block diagram can be activated with the activation of the warning device 52, which switching means separates &:he triggering circuit 40 and the restraint means 41 from the evaluating circuit 30, to prevent activation of the restraint means 41 as a result of the previously detected fault. Lastly, for reasons of securing evidence, the previously detected fault, which suggests failure of one of the sensors 10, 20 or of the processing circuits 10', 20' assigned to them, can at the same time be recorded in a memory.

In a preferred further embodiment of the invention, the acceleration-sensitive sensors 10, 20 are oppositely poled, so that there result for instance, as illustrated in FIG. 4, the output signals a10, a'20. This measure proves to be especially advantageous for the detection of disturbances of the safety device by vehicle-specific and/or external electromagnetic interference fields, which would affect the identically designed processing circuits 10, 20 in the same manner. Through the evaluation of sensor output signals of different polarity these interferences can be recognized. In an especially appropriate manner the sensors of equal polarity of the first embodiment or the oppositely posed sensors of the second embodiment at least including their associated processing circuits 10', 20' are combined in a common integrated hybrid circuit and arranged in a single housing. This results in a circuit device easy to handle and versatile in its accommodation in the vehicle, for which moreover it is ensured that it is exposed to the same temperature and acceleration influences, FIG. 5.

According to an advantageous development of the invention, acceleration-sensitive sensors 10, 20 are used which determine the acceleration effect according to different physical principles. This makes it possible to recognize interference influences from, for example, the action of electromagnetic interference fields, moisture, temperature fluctuations, aging, which although they represent equal influence parameters on the: two sensors 10, 20, are possibly picked up by them in a different manner.

Different sensors operating according to different principles may be used to practice the invention, for example, piezoelectric (ceramic or quartz pickups), piezoresistive (e.g. piezoresistive silicon), capacitive, mechanical (e.g. strain gauges, or with inductive or optical acceleration signal pickup), may be used.

Figure 5:
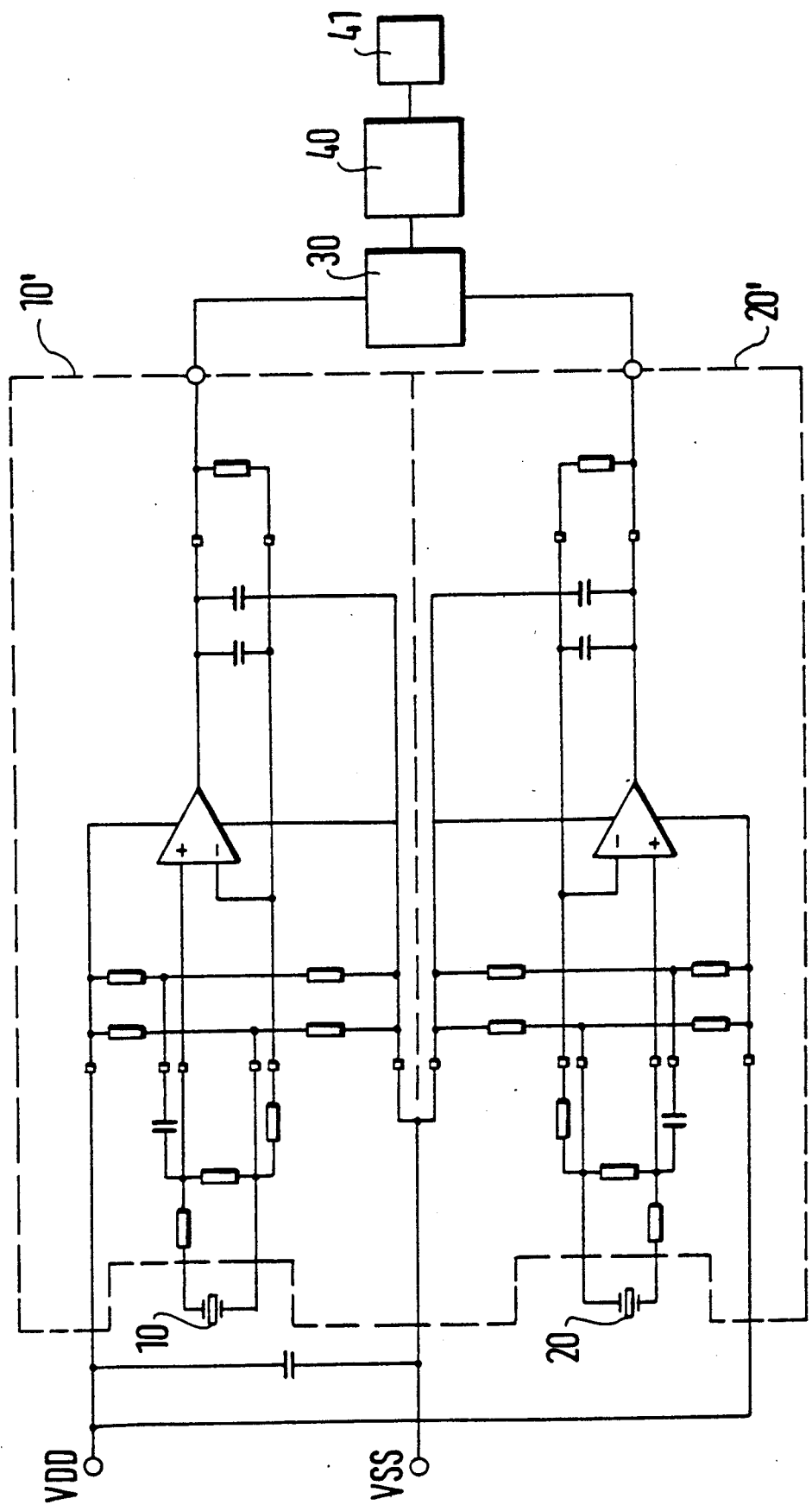
FIG. 5 is a schematic circuit diagram of an embodiment of the invention.

FIG. 5 shows a circuit schematic for the invention.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A safety device for vehicle occupants comprising at least two acceleration sensitive sensors, a processing and evaluating circuit for output signals of the sensors, restraint means and a drive circuit for the restraint means coupled to the processing and evaluating circuit, further comprising a processing circuit for each sensor and means for comparing the sensor output signals with one another and for activating a further device if a difference between the two sensor output signals exceeds a predetermined threshold value, in order to indicate that the safety device is malfunctioning.

2. The safety device recited in claim 1, wherein the sensors deliver identical output signals when subjected to the same acceleration.

3. The safety device recited in claim 1, wherein the sensors are piezoelectric acceleration-sensitive sensors.

4. The safety device recited in claim 1, wherein the sensors are connected to their respective processing circuits in equal polarity.

5. The safety device recited in claim 1, wherein the sensors are connected to their respective processing circuits in opposite polarity.

6. The safety device recited in claim 1, wherein the acceleration-sensitive sensors measure acceleration according to different physical principles relative to each other, the sensors being selected from the group including: piezoelectric, piezoresistive, capacitive, and mechanical sensors.

7. The safety device recited in claim 1, wherein the further device comprises a warning device for generating a warning signal upon detecting that the device is malfunctioning.

8. The apparatus recited in claim 1, wherein the processing circuit for each sensor comprises means for generating one of a sum and integral value from the sensor output signals over a predetermined time interval.

9. A method for operating a safety device for vehicle occupants comprising the steps of summing or integrating output signals of acceleration-sensitive sensors during a presettable interval of time, comparing the sum and integral values with one another after the presettable interval of time, and if the comparison value exceeds a presettable limit value, operating a warning device to indicate that the safety device is malfunctioning.

* * * * *

UNITED STATES PATENT AND TRADEMARK OFFICE
CERTIFICATE OF CORRECTION

PATENT NO. : 5,037,129

DATED : August 6, 1991

INVENTOR(S) : Eberhard Fritz; Bernhard Mattes; Werner Nitschke; and Lothar Gademann It is certified that error appears in the above-identified patent and that said Letters Patent is hereby corrected as shown below:

In The Drawings:
In FIG. 4, "10pg" should read --100g--.

In the Abstract, line 3, "sensors summing" should read --sensors, summing--.

In col. 3, line 12, "&:he" should read --the--.

In col. 3, line 47, "the:" should read --the--.

Signed and Sealed this

Ninth Day of February, 1993

Attest:

STEPHEN G. KUNIN

Attesting Officer

Acting Commissioner of Patents and Trademarks